United States Patent Office 3,827,896
Patented Aug. 6, 1974

3,827,896
METHOD OF PRODUCING CLINKER OF ALUMINA CEMENT
Vyacheslav Ivanovich Avdjukov, pereulok Druzhby, 13a, kv. 48, and Boris Nikolaevich Lebedev, ulitsa Furmanova 51, kv. 23, both of Alma-Ata, U.S.S.R.
No Drawing. Filed Nov. 1, 1972, Ser. No. 302,819
Int. Cl. C04b 7/32
U.S. Cl. 106—104   3 Claims

ABSTRACT OF THE DISCLOSURE

The method comprises the preparation of an aluminocalcium batch suitable for use in making alumina cement by firing aluminosilicate starting material with calcium chloride, with subsequent treatment of the resulting sintered product with sulphuric acid and precipitation of said aluminocalcium mixture from said solution with calcium-containing inorganic substances.

---

The present invention relates to a method of producing clinker of alumina suitable for use in making alumina cement. Alumina cement is a very important constructional material, since it rapidly gains its strength, is capable of setting at low temperatures and exhibits fire resistance. Due to these characteristics this kind of cement is widely used to prepare refractory concretes and various types of expanding cements and marble-like materials, as well as in performing emergency and repair operations.

Methods of producing clinker of alumina suitable for use in making alumina cement by sintering an aluminosilicate starting mixture consisting of bauxites and limestone or gypsum with coke are widely known.

The preparation of an aluminocalcium mixture consists in crushing, grinding and mixing the components thereof.

In order to produce clinker of alumina suitable for use in making alumina cement by the method of sintering, it is necessary to use high-grade bauxites and calcium-containing inorganic products having a low content of $SiO_2$ and $Al_2O_3$ (less than 2%). Recovery of such a starting material requires selective excavation, thereby resulting in considerable complications of the extraction process.

During the production of aluminocalcium batch from bauxites and calcium-containing inorganic materials, it is rather difficult to maintain a required content of silica and alumina, the elevated content of these components resulting in superficial melting of the batch, formation of accretions, low quality of clinker, etc.

In view of high cost of alumina cement due to the use of costly and highly critical bauxites having a low content of $SiO_2$ and $Fe_2O_3$, the production of alumina cement by the method of sintering is limited. The use of ferrous bauxites requires the employment of the expensive method of melting of a starting mixture in cupola furnaces, converters, blast furnaces and electric furnaces.

For these reasons alumina cement is by 3-6 times more expensive than portland cement.

It is an object of the invention to provide a method of producing clinker of alumina suitable for use in making alumina cement which ensures a reduction of the clinker cost and makes it possible to produce high-grade cement.

This and other objects of the invention are accomplished by the fact that, in order to produce clinker of alumina suitable for use in making alumina cement by preparing an aluminocalcium starting batch with subsequent sintering thereof with coke. According to the invention, in order to prepare the aluminocalcium batch the starting aluminosilicate material is fired with calcium chloride, the resulting sintered product is treated with sulphuric acid to obtain a sulphuric-acid solution of alumina, after which the aluminocalcium mixture is precipitated from the solution with calcium-containing products.

It is advantageous to fire the aluminosilicate starting batch with calcium chloride at 800–1,050° C. during 2–3 hours prior to the treatment with sulphuric acid.

Where there is an elevated iron content present in a sulphuric-acid alumina solution being employed, it is desirable to precipitate iron at a pH of 2.7 to 3.0 while mixing the solution with limestone.

The method according to the invention is generally carried out in accordance with the following procedure.

During the firing of the aluminosilicate starting material (tails and semi-products of concentration plants, used sands, ashes of thermal electric plants, clays and mixtures thereof) with calcium chloride the starting material is decomposed to alumina compounds which are readily soluble in a sulphuric acid solution. Therefore, when treating the sintered product with sulphuric acid (leaching) the sulphuric-acid solution of this soluble, sintered product is obtained and from which solution an aluminocalcium starting mixture may be precipitated by means of calcium-containing inorganic substances.

The use of cheap, easily available starting material makes it possible to reduce the cost of clinker of alumina suitable for use in making alumina cement produced thereby. Inorganic calcium-containing substances which can be used for precipitating alumina may comprise limestone, dolomite and lime. By selecting diverse precipitating agents, cements with various ratios between calcium oxide and alumina may be obtained therewith, that is, ordinary alumina cement and high alumina cement. Since the aluminosilicate starting mixture does not substantially contain components reducing the quality of cement (silica and iron oxides), the resulting cement made therefrom exhibits good quality (enhanced physical and mechanical characteristics, whiteness of clinker, etc.).

Where aluminosilicates employed contain non-ferrous, rare and noble metals, the latter may be isolated during the firing by chloride sublimation and from alumina-containing sulfuric-acid solutions by extracting or by means of ion-exchange process (depending on the metal to be isolated) prior to precipitation of the aluminocalcium starting mixture.

During the leaching process silicate filter cake is formed which may be used as an active hydraulic additive and starting component in the production of portland cement.

During the production of aluminocalcium starting mixture sulphuric acid and calcium chloride are recovered by well known methods without substantial expenses.

The obtaining of non-ferrous, rare and noble metals and active hydraulic additive, as well as the possibility of recovery of sulphuric acid and calcium chloride during the preparation of the aluminocalcium mixture all provide for an additional cost reduction of clinker of alumina cement made with alumina clinker manufactured according to the method of this invention, thus permitting a reduction in the total cost of this product as compared to that of portland cement.

Where dolomite is used to precipitate alumina, the by-production of magnesium sulphate is possible, which is necessary to obtain sorel cement. Toutton salt may also be produced.

The combination of the production of both alumina and portland cement (ordinary or white) is advantageous from the economic point of view. The process is economical when portland cement made from gypsum and alumina cement are produced at the same time.

The method according to the invention is carried out with the use of relatively simple equipment and does not require special design developments. It is possible to use standard equipment such as developed for use in uranium and vanadium plants, plants for processing pyrites cinder by chloride sublimation, superphosphate, zinc and claydite plants.

The method according to the invention may also be used to produce alumina by treatment of the resulting clinker with an alkali.

The method according to the invention will be better understood from the following specific examples of the production of clinker of alumina suitable for use in the making of alumina cement.

The process of the production of clinker of alumina includes a number of technological steps, comprising the preparation of a calcium mixture, the mixing thereof with coke and sintering the mixture at a temperature up to the temperature of clinker formation. In order to prepare aluminocalcium mixture, wastes or semi-products of the concentration of ores and coals are ground, mixed in drum mixers with calcium chloride, used in an amount of 12.5–15.0 wt. percent, and granulated in disc granulators. The resulting granules are dried in band driers and, depending on the composition of the starting product, are fired at 800–1,050° C. in a rotary kiln for a period of 2 hours. During this process non-ferrous, noble and rare metals contained in the starting material pass into sublimates, wherefrom they are isolated by a suitable conventional method. After the firing the granules are cooled in a drum cooler, ground in a dry mill and treated with a 40–60% solution of sulphuric acid in a contact vat to obtain a sulphuric-acid solution of alumina. The resulting pulp is filtered to isolate an aluminoferrous solution and rare and non-ferrous metals are separated therefrom, after which alumina is precipitated with calcium-containing inorganic substances, such as limestone, dolomite, lime, and the like.

The precipitate comprises a mixture of aluminium hydroxide, basic aluminium salts, gypsum and a small amount of the precipitating agent, that is, it comprises aluminocalcium mixture required for the production of cement clinker. Alumina is precipitated from solutions containing 30–80 g./l. of $Al_2O_3$. The starting mixture is dried in a rotary kiln with exhaust gases and is directed into a mixer, powdered coke used in an amount of 2–5% by weight of the precipitate being added into the mixer. The amount of coke used depends on the amount of gypsum in the starting mixture. Then the resulting charge is loaded into a rotary kiln or in an agglomeration machine. The formation of clinker takes place at 1,380–1,450° C.

Sulphur dioxide which is released is used to make sulphuric acid. In order to compensate for losses of sulphuric acid, lump sulphur or sulphur-containing fuel oil is added for the sintering procedure.

The method according to the invention will be better understood from the following specific examples of the production of clinker suitable for use in the making of alumina cement.

EXAMPLE 1

Tails of a copper concentration plant containing (vol. percent): $SiO_2$—68.2, $Al_2O_3$—11.76, $Fe_2O_3$—5.20, $TiO_2$—0.15, CaO—0.80, MgO—1.52, $K_2O$—3.1, $Na_2O$—0.42, Cu—0.32, other components, the balance, were subjected to additional flotation of pyrite to reduce the iron content to 2.3%. Further classification of the tails resulted in additional reduction of iron content, as calculated for $Fe_2O_3$, to 1.5%.

Fine classification product (discharge) with a yield of 26.6% was concentrated, as to alumina, up to 19.9%. After dehydration the discharge was mixed with clay containing (vol. percent): $SiO_2$—66.34, $Al_2O_3$—23.25, CaO—0.61, $Fe_2O_3$—0.81, MgO—0.1, $K_2O$—0.65, $Na_2O$—0.05, $TiO_2$—0.42, other components, the balance, with coal (5 wt. percent) and calcium chloride (15 wt. percent), and then granulated. The clay was mixed with the tails in a ratio of 3:10 in order to increase the alumina content in the charge. The alumina content was also increased due to the presence of coal ash. After drying at 250° C. for 0.5 hour, the granules were fired at 1,050° C. for 2.5 hours.

During the firing iron and potassium partially changed into a gaseous phase. Due to the presence of a slightly reducing environment or medium during the chloride firing, the release of copper into the gaseous phase was 35.6%.

Hydrogen chloride formed during the firing was used to obtain calcium chloride which was directed into the head of the process for mixing.

The fired granules were drastically cooled in water and then ground. After the firing the iron content of the batch was reduced to 0.58%, while the remaining iron was converted into a compound ($Fe_2O_3$) which is hardly soluble in sulphuric acid.

Leaching of the ground product were effected with a sulphuric acid solution (with a consumption of the solution of 120% against the stoichiometric quantity required for $Al_2O_3$ and CaO) at 85° C. for two hours.

The product filtered off after the leaching was contacted with the fired starting product to reduce the concentration of the free acid. The product ground after the firing and the filter cake after neutralization of the solution were directed to the main leaching.

Aluminum powder and hydrazine hydrate were added to the filtered solution after neutralization, the amount of each of these components corresponding to 100% with respect to the stoichiometric amount necessary for the cementation of copper and for the reduction of trivalent iron. The temperature of the solution during the cementation was maintained within a range of 45–50° C. Precipitated metallic copper was then filtered off to obtain copper powder containing 98.1% of copper, 0.82% of aluminium and 0.07% of iron.

The quantity of copper recovered from the fired granules in the solution was 96.8%. After cementation alumina was precipitated from the solution with lime and ammonia. After precipitation of alumina the solution may be used as a liquid fertilizer. The presence of hydrazine in the liquid fertilizer is favourable since it acts as a plant growth stimulator.

The total amount of alumina precipitated was 79.9%. The resulting aluminocalcium precipitate was fired at 1,450° C. for three hours. After the firing and subsequent grinding a clinker of the following composition was obtained (vol. percent):

$Al_2O_3$—65, CaO—33.3, $Fe_2O_3$+$SiO_2$—0.9.

Physical and mechanical tests have shown that this clinker could be used for preparation of alumina cement having an ultimate compression strength of up to 500 kg./cm.².

EXAMPLE 2

As a starting product there was employed ash from a thermal electric plant which contained (vol. percent):

$Al_2O_3$—27.2, $SiO_2$—63, $Fe_2O_3$—1.56, $TiO_2$—1.02,

CaO—1.2, MgO—0.6, $SO_3$—0.5, $K_2O$—1.23, $Na_2O$+$K_2O$—1.8, Ge—0.008, other components making up the balance.

After grinding of the ash to obtain a 90% yield having a size corresponding to a size classification about 0.074 mm., it was granulated with calcium chloride (12.5 wt. percent). After drying the granules were fired at 970° C. for two hours. During the firing, germanium contained in the ash was converted into a gaseous phase (sublimated). The granules, cooled in water, were ground to obtain a 90% yield of a size corresponding to a size classification of about 0.074 mm. and were then leached with 50% sulphuric acid at 85° C. for two hours.

First, iron was precipitated from the sulphuric-acid solution at pH 2.7 by contacting with lime and air for three hours.

Aluminocalcium mixture was then isolated from the cleaned solution by adding lime. After filtering and washing a filter cake was obtained which contained basic aluminium salts, aluminium hydroxide and gypsum. The amount of alumina isolated in the form of precipitate from the starting product was of 72.2%. The precipitate was subjected to firing at 1,380° C. for three hours. The resulting clinker had the following composition (vol. percent):

$Al_2O_3$—56.2, CaO—31.8, $Fe_2O_3$—4.2, $SiO_2$—0.8, $SO_3$—0.92 and other components.

Physical and mechanical tests have shown that this clinker could be used to prepare cement having an ultimate compression strength of up to 400 kg./cm.$^2$.

EXAMPLE 3

For the production of clinker of alumina cement there were employed sands of the following composition (vol. percent): $SiO_2$—63.3, $Al_2O_3$—29.11, $Fe_2O_3$—2.29, CaO—0.19, MgO—0.46, $Na_2O$—0.91, $K_2O$—0.15, other components making up the balance. The sands were ground to obtain a 90% yield having a size corresponding to a size classification of 0.074 mm. and then mixed with calcium chloride in an amount of 15 wt. percent. After drying at 250° C. for 0.5 hour the granules were fired at 840° C. for three hours. Hydrogen chloride formed during the firing was entrapped in a wet scrubber suitable for the recovery of calcium chloride, while the granules were cooled and precipitated and then ground to obtain a 90% yield having a size corresponding to a classification size of about 0.074 mm.

Alumina was leached from the ground product with a 50% solution of sulphuric acid at 85° C. for two hours. After filtering of the pulp and washing of the filter cake with hot water (at 60° C.) aluminoferrous sulphuric-acid solution was obtained and from which the main part of the iron was preliminarily isolated with dolomite at pH of 3.0. Alumina was then precipitated with fired dolomite from the solution from which the iron had been removed.

During the precipitation, magnesium passed into the solution in the form of sulphate. After evaporation and crystallization, magnesium sulphate was obtained which was suitable for use in producing sorel cement.

Aluminocalcium mixture obtained by precipitation was dried, mixed with powdered coke and fired up to sintering at 1,400° C. over a period of three hours to produce clinker of alumina suitable for use in making alumina cement. The resulting clinker contained (vol. percent):

$Al_2O_3$—58.2, CaO—36.7, MgO—2.5, $Fe_2O_3$—1.2, $SiO_2$—0.8, $SO_3$—0.92 and other components.

Physical and mechanical tests have shown that this clinker could be used to prepare alumina cement having an ultimate compression strength of up to 400 kg./cm.$^2$.

Alumina cement made from the clinker produced by the method according to the invention as disclosed herein and as illustrated in the examples exhibits high quality as shown in the following table.

TABLE

| Example | Chemical composition of clinker (wt. percent) | Ultimate strength (kg./cm.$^2$) | | | |
|---|---|---|---|---|---|
| | | Under bending after— | | Under compression after— | |
| | | 24 hours | 3 days | 24 hours | 3 days |
| No. 1 | $Al_2O_3$, 65.0<br>CaO, 33.3<br>$Fe_2O_3$, 0.5<br>$SiO_2$, 0.4<br>Others (MgO, FeO, $TiO_2$, $SO_3$).<br>The balance to 100%. | 43 | 62 | 298 | 584 |
| No. 2 | $Al_2O_3$, 56.2<br>CaO, 31.8<br>$Fe_2O_3$, 4.2<br>$SiO_2$, 0.8<br>$SO_3$, 0.98<br>MgO, 2.5<br>Others (FeO, $TiO_2$ and others).<br>The balance to 100%. | 37 | 69 | 270 | |
| No. 3 | $Al_2O_3$, 58.2<br>CaO, 36.7<br>$Fe_2O_3$, 2.2<br>$SiO_2$, 0.8<br>$SO_3$, 0.98<br>MgO, 2.5<br>Others (FeO, $TiO_2$, and others).<br>The balance to 100%. | 36 | 62 | 198 | 481 |

We claim:

1. A method of producing clinker of alumina suitable for use in making alumina cement comprising the steps of mixing an aluminosilicate material with 12.5 to 15% by weight of calcium chloride, firing the mixture and forming an aluminocalcium material, contacting said aluminocalcium material with sulfuric acid, removing alumina therefrom and forming a sulfuric acid solution of alumina, precipitating the alumina from the sulfuric acid solution with calcium-containing inorganic substance as aluminocalcium material, mixing the precipitate with 2 to 5% by weight of coke, sintering the mixture and forming alumina clinker suitable for use in making alumina cement.

2. A method as defined in Claim 1 wherein the aluminosilicate starting material is fired with calcium chloride at 800–1,050° C. for 2–3 hours.

3. A method as defined in Claim 1 including precipitating iron compounds from the sulphuric acid solution at pH 2.7–3.0 with limestone.

References Cited

UNITED STATES PATENTS

| 2,859,124 | 11/1958 | King | 106—104 |
| 2,995,455 | 8/1961 | Uemura | 106—103 |
| 3,257,219 | 6/1966 | Klein | 106—104 |

JAMES E. POER, Primary Examiner